United States Patent [19]
Lee

[11] Patent Number: 5,193,640
[45] Date of Patent: Mar. 16, 1993

[54] VEHICLE SAFETY SYSTEM FOR DRIVER PEDAL MISAPPLICATION

[76] Inventor: Hae-Seung Lee, 1 Watermill Pl., Apt. 215, Arlington, Mass. 02174

[21] Appl. No.: 642,665

[22] Filed: Jan. 17, 1991

[51] Int. Cl.⁵ .................. F01N 1/16; B60K 41/20
[52] U.S. Cl. ........................ 180/271; 74/512; 74/513; 74/560; 192/1.2; 192/1.56; 192/1.64
[58] Field of Search ............. 180/271, 315, 282, 170, 180/175; 74/512, 513, 560, 526; 192/1.21, 1.1, 1.2, 1.56, 1.64; 188/151 A

[56] References Cited

U.S. PATENT DOCUMENTS

| | | | |
|---|---|---|---|
| 3,331,478 | 7/1967 | Trifiletti et al. | 180/170 |
| 3,626,919 | 12/1971 | MacMillan | 180/271 |
| 3,872,739 | 3/1975 | Hudson et al. | 74/513 |
| 3,954,151 | 5/1976 | Budzich et al. | |
| 4,224,907 | 9/1980 | Lefeuvre et al. | 74/513 |
| 4,768,610 | 9/1988 | Pagel et al. | 180/271 |

FOREIGN PATENT DOCUMENTS

0175534  7/1989  Japan ........................ 74/513

Primary Examiner—David M. Mitchell
Assistant Examiner—Paul Dickson
Attorney, Agent, or Firm—Choate, Hall & Stewart

[57] ABSTRACT

A vehicle safety system for preventing unintended acceleration of motor vehicles due to the driver's pedal misapplication of depressing an accelerator instead of brakes against the driver's intention of stopping the vehicle. The system exploits the excessive pressure applied on the accelerator during a driver's pedal misapplication to reduce the engine speed and to apply the vehicle's brakes. The system is active only when excessive pressure is applied on the accelerator, and does not affect normal driving.

17 Claims, 5 Drawing Sheets

VEHICLE SAFETY SYSTEM FOR DRIVER PEDAL MISAPPLICATION

BACKGROUND OF THE INVENTION

There have been numerous cases of unintended acceleration of motor vehicles, resulting in property damages, injuries, even deaths and subsequent liability suits. The incidents have been reported in a variety of makes and models of motor vehicles. In the past few years, the passenger motor vehicles manufactured by Audi of West Germany have became notorious for many incidents of such unintended acceleration. The National Highway Traffic Safety Administration indicates that as many as 1,788 accidents have occurred with the Audi 5000 due to alleged unintended acceleration.

In most of the reported cases of unintended acceleration, the vehicle accelerated at or near full-throttle regardless of alleged efforts of the drivers to bring the vehicles to a stop, while the brakes seemed to be ineffective. The vehicle manufacturers blamed the driver's error, i.e., depressing the accelerator pedal rather than the brakes, however, the drivers and the consumer groups put the blame on mechanical faults of the vehicles. Mechanically, for this to happen, two failures must happen simultaneously; the engine stuck at full or near throttle, and brake failure. Automobile experts maintain that no engine in passenger motor vehicles is powerful enough to overcome normally functioning brakes to keep the vehicle accelerating under full brakes. Technologically, it seems to be very improbable for both failures to occur simultaneously. The more plausible cause for the unintended acceleration is the driver's error, as the vehicle manufacturers claim. It is possible, under certain circumstances, for a vehicle's driver to mistake the accelerator pedal for the brake pedal. Most people have such an experience, although they realize the mistake quickly and apply the brakes. However, when the driver does not realize the mistake and keeps depressing the accelerator as if it were the brake, the vehicle accelerates uncontrollably, and eventually accidents may occur. Recent tests by the automobile magazine Road & Track support this explanation. The U.S. Supreme Court also ruled in favor of Audi in recent liability suits against Audi involving unintended acceleration in Audi 5000's, determining drivers' pedal misapplication as the cause of unintended acceleration. Although it is not very clear whether pedal misapplication is the only cause of unintended acceleration, it is a much more likely cause than the simultaneous faults of the engine and brakes. The more frequent occurrence in certain makes and models of vehicles may be related to design aspects specific to such vehicles that may induce pedal misapplication.

A number of late-model passenger vehicles are equiped with an interlock mechanism frequently referred to as "shift lock". This mechanism is devised to prevent shifting into any other gear positions from "park" unless the brake pedal is depressed. This mechanism is claimed to be effective in reducing the incidents of pedal misapplication from a vehicle moving out of a parked position. However, this mechanism is not effective at all when pedal misapplication occurs in a moving vehicle. Some reports have claimed that the rate of unintended acceleration incidents in Audi 5000's did not go down significantly after all the cars were recalled to install the shift lock mechanism. Therefore, the effectiveness of the shift lock against unintended acceleration is not clear, or marginal best.

The present invention aims at more effective means of controlling unintended acceleration due to pedal misapplication. During normal driving, a driver modulates the pressure on the accelerator pedal to control the engine speed. In most passenger vehicles, only relatively light pressure on the accelerator is needed to open the throttle fully. However, when the driver mistakes the accelerator pedal for the brake, causing unintended acceleration, he depresses the accelerator pedal as hard as possible in a desperate attempt to bring the vehicle to a stop. In normally equiped vehicles, it causes the vehicle only to accelerate at a maxiumum rate, eventually causing an accident. The important observation to be made is that during the unintended acceleration, the driver depresses the accelerator pedal much harder than under normal driving conditions, because he thinks it is the brake. In the present invention, such an excessive pressure on the accelerator pedal is exploited to reduce the engine speed and/or to apply the brakes, so that the accelerator pedal acts as a brake when the driver mistakes it for the brake.

SUMMARY OF THE INVENTION

In one aspect, the invention is a motor vehicle safety system which includes an accelerator, a motor speed control device, and motor speed control device actuation means interconnected to the accelerator and to the motor speed control device to actuate a reduction in motor speed when the accelerator is exercised beyond the normal full power position. The term 'interconnected' is herein defined to include both physical and functional connections, i.e. interconnection via intermediary means. For example, the motor speed control device may be a throttle valve and the motor speed control actuation means may act to close the throttle valve when the accelerator is exercised beyond the normal full power position. Alternatively, the motor speed control device may be an electromechanical control system and the motor speed device actuation means may be a sensing device which sends a signal to the electromechanical control system in response to accelerator travel beyond the normal full power position. The safety system may further include a stop device which exerts a resistant force against the accelerator when the accelerator is exercised beyond the normal full power position. The stop device may be, for example, a spring actuated by the accelerator.

In another aspect, the invention is a motor vehicle safety system including an accelerator, brake apparatus, and brake actuation means interconnected to the accelator and to the brake apparatus to actuate the application of the brake apparatus when the accelerator is exercised beyond the normal full power position. The brake actuation may include, for example, at least one lever that is actuated by the accelerator to apply the brake apparatus when the accelerator is exercised beyond the normal full power position. The brake apparatus may have at least one power booster comprising a plurality of pneumatic chambers and the brake actuation means may include at least one valve that is actuated by the accelerator to change pressure in at least one of the pneumatic chambers when the accelerator is exercised beyond the normal full power position. In this aspect, the invention may also include a stop device as described above.

In yet another aspect, the invention is a motor vehicle safety system including a combination of the above apparatus, i.e., including an accelerator, a motor speed control device, brake apparatus, motor speed control device actuation means interconnected to the accelerator and to the motor speed control device to actuate a reduction in motor speed when the accelerator is exercised beyond the normal full power position, and brake actuation means interconnected to the accelator and to the brake apparatus adapted to actuate the application of the brake apparatus when the accelerator is exercised beyond the normal full power position. The example motor speed control device and actuation means and the example brake apparatus and actuation means described above can be applied to this aspect of the invention. A stop device as described above can also be included.

DETAILED DESCRIPTION OF THE PREFERRED EMBODIMENTS

FIGS. 1 through 4 show the first embodiment of the invention indicating a brake actuator (FIG. 1a and b), an accelerator stop (FIG. 2 and FIG. 3), and an engine speed reducer (FIG. 4). FIG. 1a and 1b show a perspective view and a top view, respectively, of the brake actuator according to the invention. A brake pedal 20, a break pedal rod 22, an accelerator pedal 24 which is connected to an accelerator cable 26 by an accelerator rod 28 are regular parts of a conventionally equiped automobile. A brake lever 30 is hinged on a brake lever base 32 which is fixed to a firewall 34 of the vehicle. The left end of the brake lever hooks the brake pedal rod 22, while the right end has a gap 36 to the accelerator rod 28 when the accelerator is not depressed and is in the resting position. The gap 36 between the right end of the break lever 30 and the accelerator rod 28 is best shown in FIG. 1b. An accelerator stop 38 fixed to the firewall 34. The accelerator stop 38, by its spring action, gives a resistant force against an excessive accelerator travel. This resistant force ensures that the brakes are actuated by the accelerator pedal only in the occasion when much greater pressure is exerted on the accelerator pedal. The accelerator stop 38 is described in greater detail in the next paragraph in relation to FIG. 2. When the accelerator is pushed beyond the normal operating range, the accelerator pedal rod 28 pulls the right end of the brake lever 30 forward, pushing the brake pedal rod 22 toward the firewall, actuating the brakes. The gap 36 between the accelerator rod 24 and the brake lever 30 prevents the brake from actuated by the brake lever 30 in the normal range of the accelerator pedal travel. This ensures that the added mechanism consisting of the brake lever 30, the brake lever base 32, and the accelerator stop 38, does not affect normal driving.

Figure 1A:
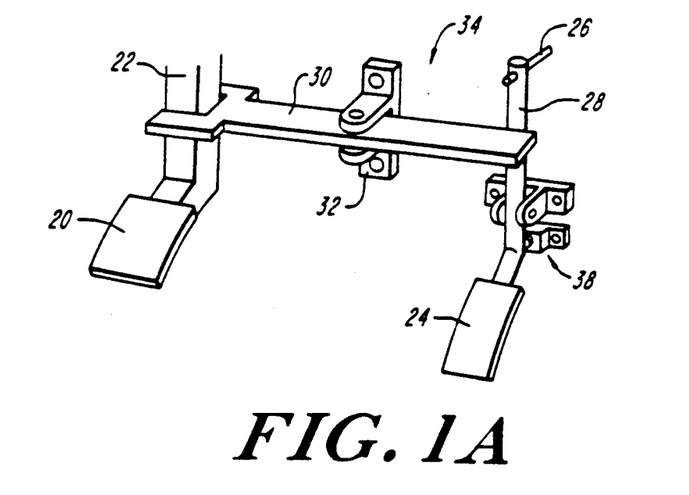
FIGS. 1a and 1b are a perspective and a top view respectively of a pedal arrangement and a brake actuator in the footwell of the vehicle according to the first embodiment of the invention.
Figure 1B:
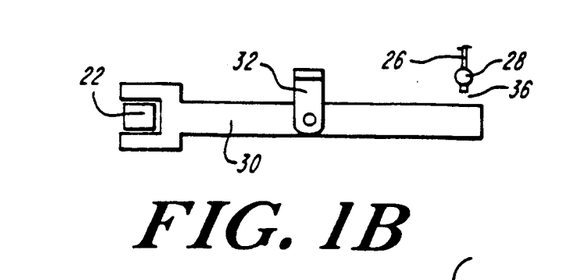
Figure 2:
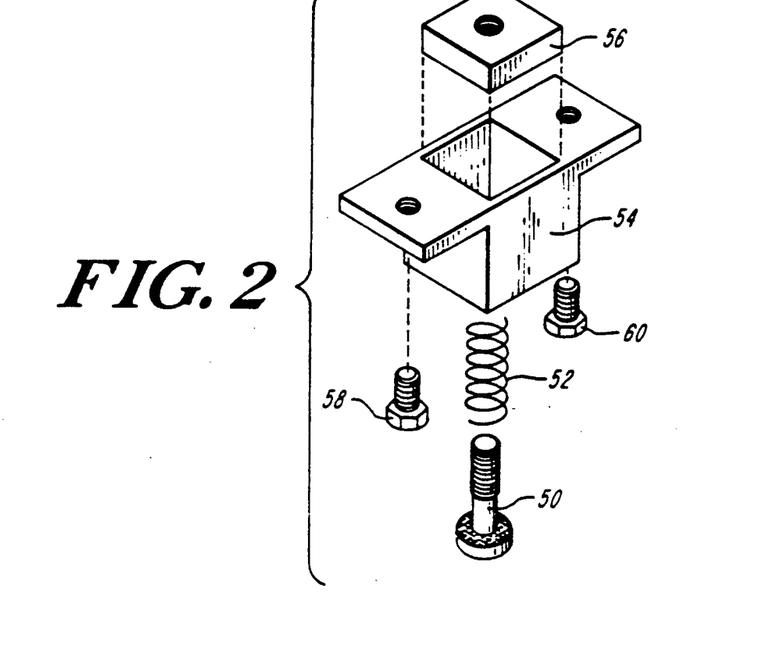
FIG. 2 is an isometric exploded view of an accelerator stop according to the first embodiment of the invention.

FIG. 2 shows a detailed isometric exploded view of the accelerator stop 38. The accelerator stop 38 consists of a plunger 50, a spring 52, a housing 54, and a plunger guide nut 56. The housing 54 is secured to the firewall 34 of the vehicle. The spring 52 is wrapped around the plunger rod. The plunger 50 consists of a head and a rod. The plunger head diameter is larger than that of the plunger rod resembling a bolt so as to hold the spring 52 in its place. The end of the plunger rod has machine screw groves to accept the guide nut 56. The guide nut 56 has a square shape that fits inside the housing 54 so that the guide nut 56 slides up and down in the housing 54, acting as a plunger guide. The surfaces of the housing 54 and the plunger 50 that face the spring 52 have a rough finish to prevent the plunger from turning out of its adjusted position. The clearance between the plunger head and the accelerator pedal 24 can be adjusted by turning the plunger head. It may be necessary for the adjustment to be possible with a special tool at the factory only for safety considerations. The accelerator stop 38 as a whole provides a resistant force when the accelerator pedal is being depressed beyond the normal full-throttle position. This ensures that the excessive accelerator travel is possible only when the accelerator pedal is depressed with a much stronger force than that applied in normal driving conditions.

Figure 3:
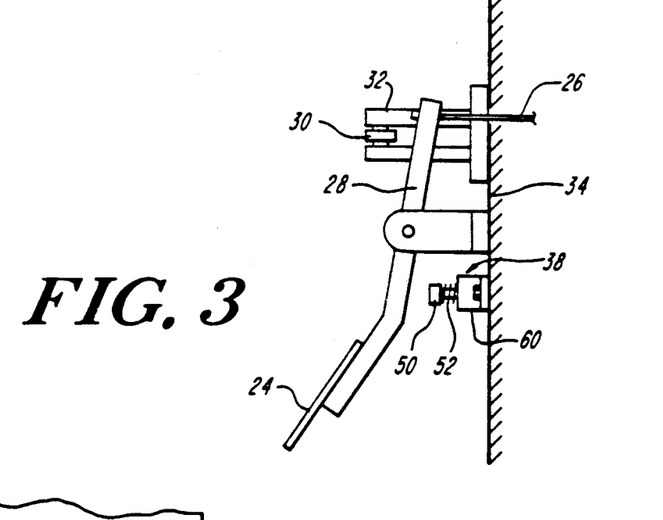
FIG. 3 is a side view showing an arrangement of an accelerator pedal, an accelerator stop, and a brake actuator, according to the first embodiment.
Figure 4A:
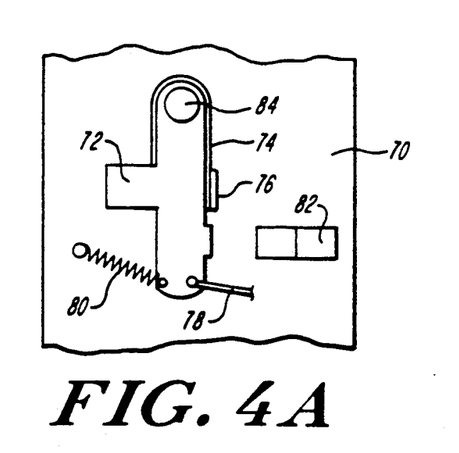
FIGS. 4a, 4b, and 4c are a frontal, a side, and a bottom view respectively of an engine speed reducer according to the first embodiment.
Figure 4B:
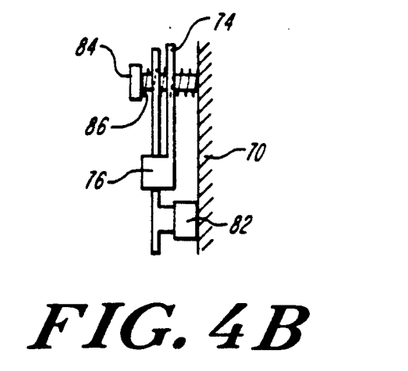
Figure 4C:
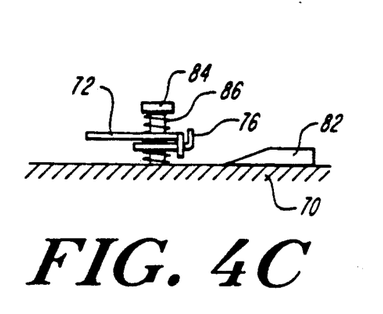
Figure 4D:
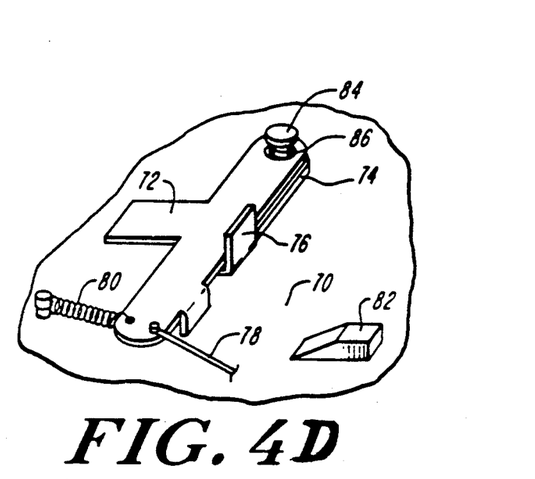
FIG. 4d is a perspective view of the same.

FIG. 3 depicts the side view of an arrangement of the accelerator pedal 24 and the accelerator stop 38, and the brake lever 30 according to the invention. The accelerator stop 38 is fixed to the firewall 34 by screws 58 and 60. In the event the accelerator pedal 24 is pushed beyond the normal full throttle position, the accelerator pedal rod 28 presses the plunger 50, which then exerts a resistant force due to the reactive force of the spring 52, as described previously. The contact between the accelerator pedal rod 28 and the plunger 50 happens before the accelerator pedal rod 28 pushes the brake lever 30 to actuate the brakes as explained in conjunction with FIG. 1a and FIG. 1b. This ensures that the brakes are actuated only when the accelerator pedal 24 is pushed in beyond the full throttle position with a considerable effort surmounting to the pedal misapplication.

In FIG. 4, an engine speed reducer according to the first embodiment is shown. The engine speed reducer is implemented by modifying conventional throttle linkages in the engine. A throttle lever 74 is connected to a throttle valve inside a throttle body 70. When the throttle lever 74 is in its full clockwise position, the throttle valve is closed, and the engine idles. The counterclockwise rotation of the throttle lever 74 opens the throttle valve, increasing the engine speed. A throttle return spring 88 is ankered to the throttle lever 74 and the throttle body 70, to provide the clockwise restoring force for the throttle lever 74 to its idle (fully clockwise) position. A free-rotating secondary lever 72 is pressed against the throttle lever 74 by a spring 86. The accelerator cable 26 is connected to the secondary lever 72, and a secondary lever return spring 80 is hooked to the secondary lever 72 and the throttle body 70 to provide clockwise restoring force for the secondary lever 72 and the accelerator cable 26. An anker arm 76 extends perpendicular to the throttle lever 74, so that the clockwise restoring force of the spring 88 stops the throttle lever 74 against the secondary lever 72. Henceforth, in normal operations, the lever 74 and the lever 72 turns together, when the accelerator cable 26 is pulled or released. A wedge 82 on the throttle body 70 is placed slightly past the normal full throttle position of the secondary lever 72. In the normal range of the accelerator, the secondary lever 72 is pressed against the throttle lever 74 by the spring 86. When the accelerator is depressed, the accelerator cable 26 is pulled to the right, rotating the secondary lever 72 counterclockwise. The throttle lever 74 rotates together with the secodary lever 72, because because the throttle lever anker arm 76 is pushed by the secondary lever 72. This counterclockwise rotation of the throttle lever opens the throttle valve, increasing the engine speed. When the accelerator pedal is released, the secondary lever 72 turns clockwise by the secondary lever return spring 80, as does the throttle lever 74 by the restoring force of the throttle return spring 88. This closes the throttle valve, reducing the engine speed. It should be noted that the modified throttle linkage functions exactly the same way as a conventional throttle linkage does within the normal travel of the accelerator. Thus, the modification has no effect in normal driving conditions. However, when the accelerator cable is pulled beyond the normal range due to the driver's pedal misapplication, the wedge 82 on the throttle body 70 lifts the secondary lever 72 from the throttle lever 74. When the secondary lever 72 is lifted far enough to clear the throttle lever anker arm 76, the throttle lever 74 snaps back to the idle position by the restoring force of the throttle return spring 88, reducing the engine speed to the idle speed. When the accelerator pedal is fully released afterwards, the secondary lever 72 returns to the idle position past the anker arm 76, the secondary lever 72 is again pressed to the throttle lever 74, and the normal operation of the throttle linkage resumes.

The second embodiment employs identical accelerator stop and brake actuator to the first embodiment. However, an engine speed reducer is implemented utilizing an electronic engine speed control already installed in most modern vehicles.

Figure 5:
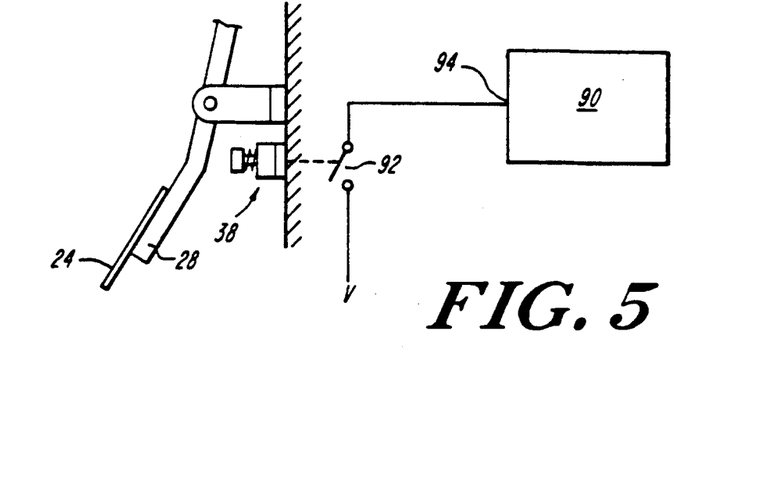
FIG. 5 is a schematic representation of an engine speed reducer employing an engine speed controller.

Referring to FIG. 5, an electrical switch 92 is activated by the plunger of the accelerator stop 38 according to the first embodiment of the invention. The switch 92 closes when the accelerator stop plunger 50 is pressed by the accelerator pedal rod 28, indicating the pedal misapplication. This applies a voltage to an input 94 of an electronic engine control system 90, which then reduces the engine speed. Such reduction in engine speed can be achieved by reducing the fuel delivery in the electronic fuel injected engine, or by a servo control of the throttle valve.

As in the case of the first embodiment, the throttle release is abrupt in the most straightforward implementation, in that when the electric signal is sent from the switch 92 to the engine control system 90, the engine speed is quickly reduced to idle. This may be uncomfortable for the driver, or perhaps can be hazardous if this happens in mid-turn causing similar effect to "lift throttle oversteer". This is due to the braking action of the engine when the engine speed is abruptly reduced, which tends to make the tail of the car skid outwards in mid-turn. This potential problem can be circumvented by programming the engine control system 90 so that the engine speed is reduced gradually with time.

In place of the electrical switch 92, a position transducer can be employed which sends an electrical signal which depends on how far the accelerator pedal is pushed in. This electrical signal is then used by the engine control system to progressively reduce the engine speed depending on the extent how far the accelerator pedal is pushed in, rather than abruptly reducing it to idle. This reduces the potential lift throttle oversteer hazard.

Figure 6:
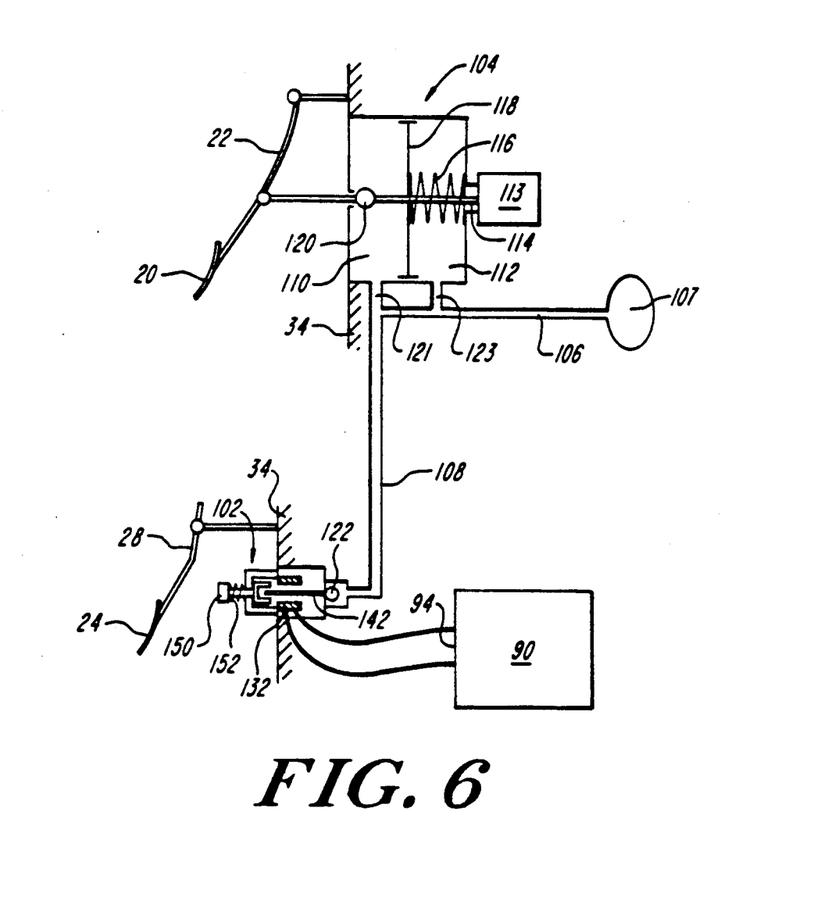
FIG. 6 is a schematic representation of an integrated assembly of an accelerator stop, a brake actuator, and an engine speed reducer, according to the third embodiment of the invention, along with a conventional power brake booster.

FIG. 6 schematically shows the third embodiment of the invention which utilizes vacuum assisted power brake booster for brake actuation. A vacuum power booster 104 is an ordinary part of a braking system in a vehicle equiped with power brakes. It is necessary to describe the structure and the operation of the conventional power booster 104 before the structure and the operation of the additional parts according to the invention is explained. The booster 104 has two pneumatic chambers 110 and 112 separated by a movable diaphragm 118. A push rod 114 is connected to the brake pedal rod 20 and a hydraulic master cylinder 113. An air valve 120 and the diaphragm 118 are fixed to the push rod 114. A spring 116 is inserted around the push rod 118 and pushes against the diaphragm 118 and the outer wall of the right chamber 112. This spring action pushes the brake pedal 20 to the resting position. Air is evacuated from both chambers 110 and 112 through air outlets 121 and 123, and the tube 106 which is connected to an intake manyfold 107 of the engine. When the brake pedal 20 is in the resting position, both sides of the diaphragm 118 is in vacuum created by the intake manyfold 107. When the brake pedal 20 is depressed, the valve 120 is opened, so that air gets in the left side of the booster chamber 110, creating a pressure differential between the chamber 110 and the chamber 112. This pressure differential pushes the diaphragm 118 and the push rod 114 to the right. The push rod 114 actuates the master cylinder 113 of the hydraulic brake system of the vehicle, actuating the brakes.

Now, additional parts according to the third embodiment of the invention is described. In FIG. 6, an integrated assembly 102 of an accelerator stop, a brake actuator, and an engine speed reducer is shown. The integrated assembly 102, the accelerator pedal 24, and the accelerator rod 28 are fixed to the firewall 34. The integrated assembly is connected to an air tube 108 that connects to the air outlet 121 of the bower booster 104. A position transducer 100 is fixed inside the integrated assembly 102. The position transducer 100 is electrically connected to the engine control system 90. An air valve 122 is connected to the accelerator stop plunger 150 by a push rod 142. Now, the operation of the third embodiment is described. In normal driving conditions, the accelerator 24 moves within the normal range to modulate the engine speed. The valve 122 is normally closed because it is pushed against the opening of the housing 140 by the spring 152. When the valve 122 remains closed, the operation of the power booster 104 is unaltered, and the power brake system operates normally as a conventional system as previously described. However, when the driver mistakes the accelerator pedal 24 for the brake pedal, he depresses the accelerator pedal 24 very hard pushing the accelerator stop plunger 150 in, accordingly opening the valve 122. This allows the atmospheric pressure to get into the left chamber 110 of the power booster, pushing the diaphragm 118 and the push rod 114, actuating brakes. Also, when the plunger 150 is pushed in, the position transducer sends an electric signal to the engine control system 90 to reduce the engine speed. By appropriate programming of the engine control system 90 the reduction of the engine speed can be made progressively depending on how far the plunger 150 is pushed in.

Figures 7A, 7B:
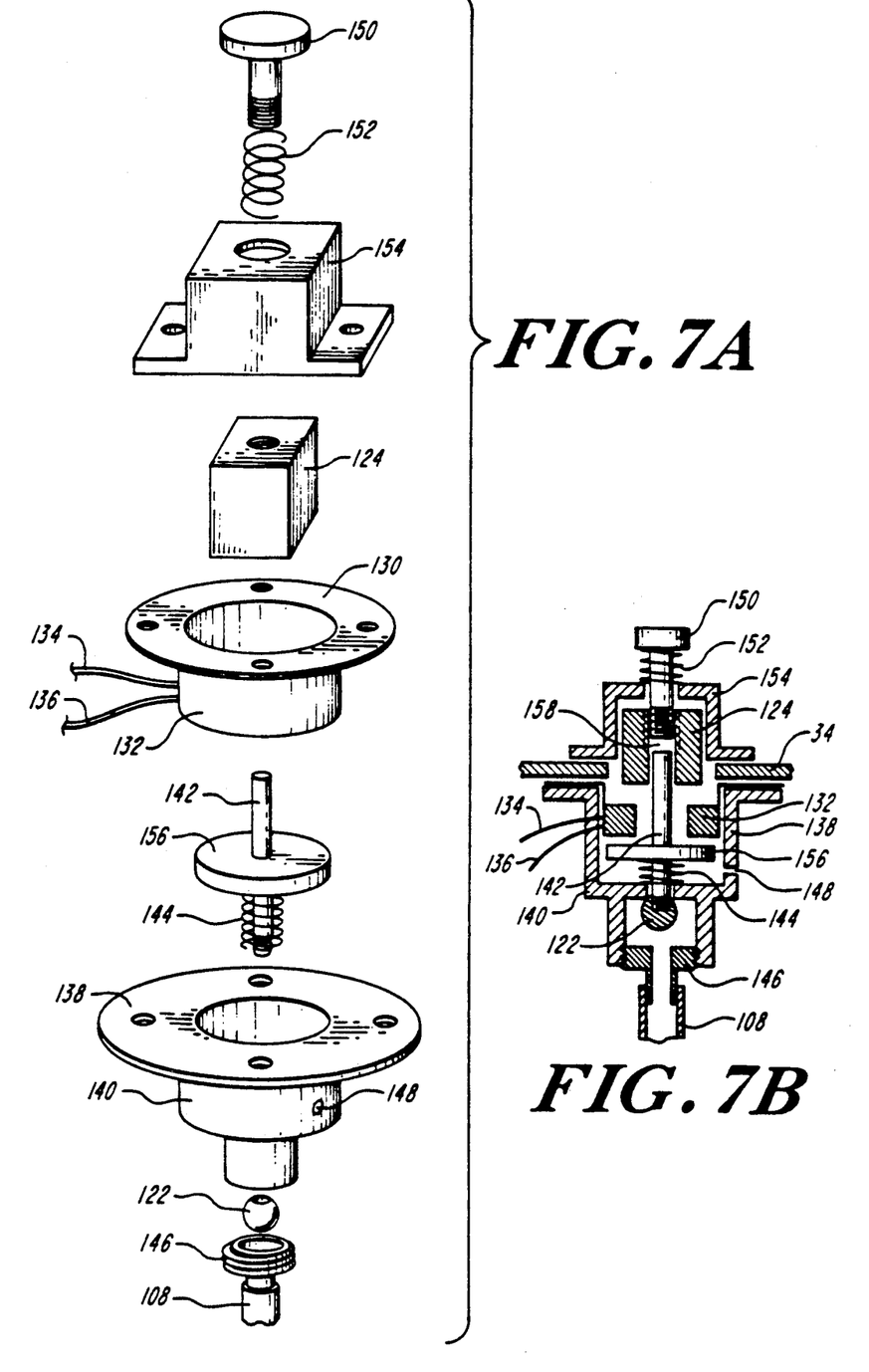
FIGS. 7a and 7b are detailed isometric exploded view and a cross section respectively of the integrated assembly as shown in FIG. 6.

FIG. 7a and 7b show a detailed isometric exploded view and a cross section respectively of the integrated assembly 102. The accelerator stop plunger 150 is screwed in a guide nut 124, which slides in a housing 154. A spring 152 is wrapped around the plunger 150, and pushes against the head of the plunger 150 and the upper surface of the housing 154. The housing 154 is secured to the firewall 34. A push rod 142 has a flange 156 in the middle which slides in an integrated assembly housing 140. The push rod 142 slides in the guide nut 124. A gap 158 inside the guide nut 124 is place between the end of the plunger 150 and the push rod 142. A spring 144 is inserted around the push rod 142 below the flange 156. A position transducer 132 along with the output wires 134 and 136 encircles the upper part of the push rod 142. The position transducer 132 senses the position of the push rod, and sends an electrical signal to the engine control system 90 through the wires 134 and 136. A spherical valve 122 is screwed onto the end of the push rod 142. The housing 140 has a flange 138 by which it is secured to the firewall 34. A hole 148 is drilled on the housing 140 to let the air in when the valve 122 is open. A cap 146 screws into the housing 140, and the tube 108 is connected to the end of the cap. As described in relation to FIG. 5, the tube 108 is connected to the power booster 104. The operation of the integrated assembly 102 is now described. Normally, the plunger 150 is pushed fully upward by the spring 152, and the valve 122 is closed due to the spring force of the spring 144, that pushes the flange 156 upward. When the plunger 150 is pushed in by the accelerator 24 due to the excessive pedal travel, the spring 152 contracts and exerts a resistant force. The valve 122 remains closed until the plunger 150 is pushed in far enough to close the gap 158. When the plunger is pushed in further, the valve 122 opens, and air flows in through the hole 148 into the housing 140, and then through the valve 122, into the tube 108. This increases the pressure in the left chamber 110 of the power booster 104, actuating the brakes, as described previously. When the accelerator pedal is released, the valve 122 is closed again, and vacuum develops in the left chamber 110. The brake is released by the spring force of the spring 116, and the normal operation of the vehicle resumes. The gap 158 ensures that the brakes are actuated and the engine speed reduced only when the plunger 150 is pushed in with strong enough force to overcome the gap.

Figure 8:
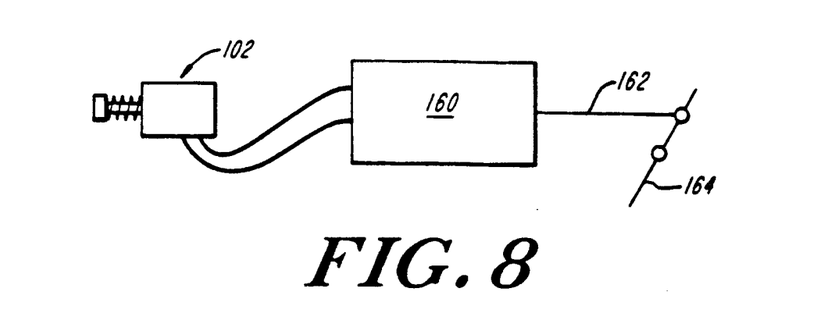
FIG. 8 is a schematic representation of an engine speed reducer implemented with a servo control unit that actuates a throttle valve of the vehicle.

The fourth embodiment of the invention is shown in FIG. 8. This embodiment is identical to the third embodiment except that a separate servo control unit 160 is employed rather than the existing engine control system 90 in the third embodiment. The position transducer output from the integrated assembly 102 according to the third embodiment is sent to the servo control unit 160. A servo arm 162 actuated by the servo control unit, moves the throttle valve 164. The engine speed in reduced by this servo control of the throttle valve. The brake actuation is performed the same way as in the third embodiment described previously.

The fifth embodiment (figure not shown) employs the identical integrated assembly 102 according to the third embodiment with the exception that the position transducer is removed. Instead, this embodiment uses the identical embodiment of the engine speed reducer according to the first embodiment.

Due to the simplicity of incorporation into existing vehicles, the third embodiment of the invention is preferred by the inventor, while other embodiments described hereto are presented as alternative embodiments. Having described the invention through preferred and alternative embodiments, it is to be noted that these e embodiments have been shown in their ideal forms, and various changes and modifications may be imparted thereto without substantially departing from the spirit and scope of the invention which are determined soley by the appended claims.

What is claimed is:

1. A safety system for use in a motor vehicle comprising:
    an accelerator adapted to open a throttle valve in response to user pressure, the accelerator having a first position wherein the throttle is fully opened when the accelerator is depressed to the first position, and a second position wherein the accelerator is depressed beyond the first position,
    a motor speed control device, and
    motor speed control device actuation means interconnected to said accelerator and to said motor speed control device so as to actuate a reduction in motor speed when said accelerator is in said second position.

2. The safety system of claim 1 wherein said motor speed control device comprises said throttle valve and wherein said motor speed control device actuation means closes said throttle valve when said accelerator is in said second position.

3. The safety system of claim 1 wherein said motor speed control device comprises an electromechanical control system and said motor speed control device actuation means comprises a sensing device which sends a signal to said electromechanical control system in response to accelerator travel in said second position.

4. The safety system of claim 1 further comprising a stop device which exerts a resistant force against said accelerator when said accelator is in said second position.

5. The safety system of claim 4 wherein said stop device comprises a spring actuated by said accelerator when said accelerator is in said second position.

6. A safety system for use in a motor vehicle comprising:
    an accelerator adapted to open a throttle valve in response to user pressure, the accelerator having a first position wherein the throttle is fully opened when the accelerator is depressed to the first position, and a second position wherein the accelerator is depressed beyond the first position,
    brake apparatus, and
    brake actuation means interconnected to said accelerator and to said brake apparatus so as to actuate the application of said brake apparatus when said accelerator is in said second position.

7. The safety system of claim 6 wherein said brake actuation means comprises at least one lever that is actuated by said accelerator to apply said brake apparatus when said accelerator is in said second position.

8. The safety system of claim 6 wherein said brake apparatus has at least one power booster comprising a plurality of pneumatic chambers and said brake actuation means comprises at least one valve that is actuated by said accelerator to change pressure in at least one of said pneumatic chambers when said accelerator is in said second position.

9. The safety system of claims 6, 7, or 8 further comprising a stop device which exerts a resistant force against said accelerator when said accelerator is in said second position.

10. The safety system of claim 9 wherein said stop device comprises a spring actuated by said accelerator when said accelerator is in said second position.

11. A safety system for use in motor vehicles comprising:
an accelerator adapted to open a throttle valve in response to user pressure, the accelerator having a first position wherein the throttle is fully opened when the accelerator is depressed to the first position, and a second position wherein the accelerator is depressed beyond the first position,
a motor speed control device,
brake apparatus,
motor speed control device actuation means interconnected to said accelerator and to said motor speed control device so as to actuate a reduction in motor speed when said accelerator is in said second position.
brake actuation means interconnected to said accelerator and to said brake apparatus so as to actuate the application of said brake apparatus when said accelerator is in said second position.

12. The safety system of claim 11 wherein said brake actuation means comprises at least one lever that is actuated by said accelerator to apply said brake apparatus when said accelerator is in said second position.

13. The safety system of claim 11 wherein said brake apparatus has at least one power booster comprising a plurality of pneumatic chambers and said brake actuation means comprises at least one valve that is actuated by said accelerator to change pressure in at least one of said pneumatic chambers when said accelerator in said second position.

14. The safety system of claims 11, 12, or 13 wherein said motor speed control device comprises said throttle valve and wherein said motor speed control device actuation means closes said throttle valve when said accelerator is in said second position.

15. The safety system of claims 11, 12, or 13 wherein said motor speed control device comprises an electromechanical control system and said motor speed control device actuation means comprises a sensing device which sends a signal to said electromechanical control system in response to accelerator travel in said second position.

16. The safety system of claims 11, 12, or 13 further comprising a stop device which exerts a resistant force against said accelerator when said accelerator is in said second position.

17. The safety system of claim 16 wherein said stop device comprises a spring actuated by said accelerator when said accelerator is in said second position.

* * * * *

UNITED STATES PATENT AND TRADEMARK OFFICE
CERTIFICATE OF CORRECTION

PATENT NO. : 5,193,640

DATED : March 16, 1993

INVENTOR(S) : Hae-Seung Lee

It is certified that error appears in the above-indentified patent and that said Letters Patent is hereby corrected as shown below:

Column 2, line 2, after "marginal" please insert "at";

Column 7, line 22, delete "place" and insert therefor --placed --;

Column 8, line 16, after "these" please delete "e".

Signed and Sealed this

Twenty-eighth Day of December, 1993

Attest:

BRUCE LEHMAN

Attesting Officer     Commissioner of Patents and Trademarks